(12) United States Patent
Staehler et al.

(10) Patent No.: US 8,394,252 B2
(45) Date of Patent: Mar. 12, 2013

(54) EXHAUST GAS PURIFICATION SYSTEM FOR A FUEL CELL OR A FUEL CELL STACK

(75) Inventors: Markus Staehler, Dueren (DE); Martin Mueller, Sinzig (DE)

(73) Assignee: Forschungszentrum Juelich GmbH, Juelich (DE)

( * ) Notice: Subject to any disclaimer, the term of this patent is extended or adjusted under 35 U.S.C. 154(b) by 526 days.

(21) Appl. No.: 12/449,676

(22) PCT Filed: Mar. 1, 2008

(86) PCT No.: PCT/DE2008/000368
§ 371 (c)(1),
(2), (4) Date: Aug. 20, 2009

(87) PCT Pub. No.: WO2008/110138
PCT Pub. Date: Sep. 18, 2008

(65) Prior Publication Data
US 2010/0316927 A1 Dec. 16, 2010

(30) Foreign Application Priority Data
Mar. 13, 2007 (DE) .......... 10 2007 012 059

(51) Int. Cl.
*C25B 1/00* (2006.01)
*H01M 8/24* (2006.01)
*H01M 8/04* (2006.01)
*B23H 11/00* (2006.01)

(52) U.S. Cl. ........ 205/343; 429/452; 429/513; 204/242; 204/275.1

(58) Field of Classification Search .......... 429/400, 429/408, 410–412, 415–418, 423–428, 430, 429/432, 443, 445–449, 452, 471, 512, 535, 429/513; 205/334, 464, 555, 343; 204/242, 204/275.1

See application file for complete search history.

(56) References Cited

U.S. PATENT DOCUMENTS

| | | | |
|---|---|---|---|
| 5,300,370 A * | 4/1994 | Washington et al. | 429/434 |
| 7,252,900 B2 * | 8/2007 | Ballantine et al. | 429/411 |
| 2004/0013928 A1 * | 1/2004 | Yamauchi et al. | 429/34 |
| 2004/0058209 A1 | 3/2004 | Benson et al. | |
| 2004/0180249 A1 * | 9/2004 | Pham et al. | 429/33 |
| 2004/0191584 A1 * | 9/2004 | Rice et al. | 429/13 |
| 2005/0053813 A1 | 3/2005 | Ballantine et al. | |
| 2006/0054512 A1 | 3/2006 | Ballantine et al. | |
| 2007/0128478 A1 | 6/2007 | Ballantine et al. | |
| 2008/0060935 A1 * | 3/2008 | Hartvigsen | 204/242 |

FOREIGN PATENT DOCUMENTS

WO WO-2007/125394 11/2007

* cited by examiner

*Primary Examiner* — Barbara Gilliam
*Assistant Examiner* — Claire L Roe
(74) *Attorney, Agent, or Firm* — Jordan and Hamburg LLP

(57) ABSTRACT

Provided is a fuel cell or a fuel cell stack, wherein a means for reducing the concentration of unreacted alcohol is disposed on the cathode exhaust gas side. This means comprises in particular an additional electrochemical cell, to which a voltage is applied and which at least partially converts the unreacted alcohol into $CO_2$ and hydrogen or water by way of an electrochemical reduction reaction. Since the concentration of unreacted alcohol is generally low, the loss of power required for the additional reduction reaction does not result in any notable impairment of the efficiency of the fuel cell stack. The invention is thus not limited to direct-methanol fuel cells, but may also be similarly applied to high-temperature fuel cells, and particularly to high-temperature PEM fuel cells, in which the additional electrochemical cell disposed on the cathode exhaust gas side is advantageously able to convert the residual CO.

17 Claims, 4 Drawing Sheets

EXHAUST GAS PURIFICATION SYSTEM FOR A FUEL CELL OR A FUEL CELL STACK

The invention relates to exhaust gas purification for a fuel cell or a fuel cell stack, and particularly for a low-temperature fuel cell, and to a method for operating such a stack.

BACKGROUND OF THE INVENTION

A direct-alcohol fuel cell comprises a cathode, an electrolyte, and an anode. The cathode is fed an oxidizing agent, for example in the form of air, and the anode is fed an alcohol fuel, for example in the form of a methanol-water mixture.

In order to achieve high electric output, a plurality of fuel cells are generally electrically and mechanically connected to each other by connecting elements (bipolar plates). This creates electrically series-connected fuel cells that are stacked on top of each other, which are referred to as a fuel cell stack. They comprise the bipolar plates and electrode-electrolyte units.

In a direct-methanol fuel cell, the fuel is added in the form of a methanol-water mixture. The depleted, which is to say partially reacted, methanol-water mixture, is removed from the anode regions in order to recycle the fuel on the anode side. It is known that during the electrochemical reaction, not only protons, but also non-negligible quantities of water and alcohol, which in this case is methanol, always migrate through the membrane onto the cathode side. This unreacted methanol would usually arrive at the exhaust, together with the resulting water that is created at the cathode, by way of the cathode exhaust gas line, which of course should be prevented.

Thus, according to the state of the art, as an alternative, a catalytic burner is disposed downstream of a direct-alcohol fuel cell stack on the cathode exhaust gas side, the object of this burner being to burn the organic constituents from the cathode exhaust gas by way of the residual oxygen.

The disadvantage is that, for reasons having to do with energy, direct-methanol fuel cell stacks are nowadays operated at a temperature between 70 and 80° C. The air that exists as part of the process on the cathode side is generally saturated with water vapor. In addition, the oxygen that is used as an oxidizing agent is usually consumed during the electrochemical reaction in the fuel cells. Thus, depending on the operating parameters, the remaining oxygen content amounts to just a few percent, or even less, in the cathode exhaust gas. As a result, the residual oxygen content is hardly sufficient for the catalytic combustion.

As another alternative for reducing alcohol emissions from a direct-alcohol fuel cell, a catalytic reaction in the exhaust gas collector line, on the cathode side, has been proposed in the literature, as has a porous layer coated with a catalyst, which brings about the reaction of unreacted alcohol, inside a cathode region of each fuel cell.

Likewise known is the alternative of firstly directing the cathode exhaust gas flows, individually, or as a collective exhaust gas flow, to an anode region of an additional or identical fuel cell, and then electrochemically reacting the unreacted alcohol there. Accordingly, this configuration has only one common discharge port for the exhaust gas from the anode region.

SUMMARY OF THE INVENTION

It is an object of the invention to create a fuel cell, or a fuel cell stack, in which organic constituents, and particularly unreacted alcohol, aldehydes, or organic acids, can be removed from the exhaust gas. It is also an object of the invention to provide a method for operating such a fuel cell, or such a fuel cell stack.

The objects of the invention are achieved by a fuel cell stack including all of the characteristics according to the main claim, and by a method according to the additional independent claim. Advantageous embodiments are apparent from the dependent claims, which refer to these claims.

The invention relates to a fuel cell stack, which according to the invention comprises an additional means for reducing the concentration of organic constituents in the exhaust gas. While the invention primarily relates to low-temperature fuel cells, such as direct-methanol fuel cells, it can also be applied to high-temperature fuel cells, and in this field, particularly to high-temperature PEM fuel cells.

Hereinafter, a low-temperature fuel cell stack is described as an advantageous embodiment of the invention. In a direct-alcohol fuel cell stack, an alcohol-water mixture is used as the fuel. In addition to the electrochemical reaction of the alcohol-water mixture at the anode, some of this mixture also reaches the cathode side by way of the electrolyte membrane. The cathode exhaust gas, which generally comprises reacted air and resulting water, thus also includes unreacted alcohol and possibly additional organic impurities, which must be removed. In addition to the alcohols methanol and ethanol, formaldehyde, carbon monoxide and formic acid shall be mentioned as examples of such impurities.

Within the context of the invention, it was found that anodic reactions in a fuel cell can be used to reduce, or completely eliminate, the unwanted alcohol or other organic impurities, such as those that usually occur in a direct-alcohol fuel cell stack, and which are present in the cathode exhaust gas. In this way, it is generally possible to maintain the concentration of organic impurities in the cathode exhaust gas very low, or even prevent these, during operation of the fuel cell stack.

Thus, according to the invention, before the cathode exhaust gas is released into the exhaust, it is conducted through an additional means, which generally reduces the organic constituents in the cathode exhaust gas, or entirely converts these to $CO_2$ and water. Advantageously, the additional means is an electrochemical cell, which is configured similar to a fuel cell. It is positioned in a suitable manner in the fuel cycle.

The additional electrochemical cell is able to react the unreacted alcohol or other organic components by way of water or water vapor and a voltage source according to the following formula:

$$CH_3OH + H_2O \longrightarrow CO_2 + 3H_2$$

The cathode exhaust gas to be purified is conducted from a fuel cell stack as fuel gas, by way of the anode of the additional means. The electrodes are connected to the voltage source. The cell voltage applied ranges between 0.2 and 10 V, and particularly between 0.5 and 5 V. The applied voltage is dependent, among other things, on the catalyst that is provided on the anode. A conventional catalyst, such as that which is also used for alcohol fuel cells, can be employed as the catalyst for the reaction of the organic components. Suitable catalysts comprise, for example, platinum or a ruthenium-platinum mixture. The cathode is usually freely exposed to the surrounding area, thereby allowing atmospheric oxygen for the electrochemical reaction on the cathode side to reach the cathode. This can advantageously be implemented, for example, in the form of a porous layer, which is provided on the cathode and is open to the exterior.

The electrode reactions involved are as follows:

Anode $CH_3O+H_2O \rightarrow CO_2+6e^-+6H^+$

Cathode $1.5O_2+6e^-+6H^+ \rightarrow 3H_2O$

Since the concentration of alcohol or other organic impurities in the cathode exhaust gas of the fuel cell stack is generally very low, the additional electrochemical cell used for reacting these substances can be designed considerably smaller than the fuel cells that are provided in the stack for power generation.

As a result of the voltage that is applied to the additional electrochemical cell, the undesirable organic impurities, and particularly the alcohol, can advantageously be electrochemically reacted. The power required to do so is generally low, as compared to the power that is generated in the fuel cell stack, so that the efficiency of the entire system is reduced only very slightly by the additional fuel cell. In contrast, by keeping the concentrations of organic impurities in the exhaust gas flow low, the fuel cell can also be operated in sensitive locations.

The fuel cell system according to the invention is thus not limited to known low-temperature fuel cells, but can also be applied to so-called high-temperature PEM fuel cells. The concept of this fuel cell type is to use hydrogen-rich, carbon monoxide-containing gas in the anode cycle. In the event that the CO cannot be completely removed, this method also allows the residual gases from the anode cycle to be freed of CO residue and, as a matter of course, of $H_2$ residue as well, by way of such an electrochemical cell.

The subject matter of the invention will be described in more detail hereinafter, with reference to an exemplary embodiment and to the figures, without thereby limiting the subject matter of the invention.

DESCRIPTION OF THE PREFERRED EMBODIMENTS

Figure 6:
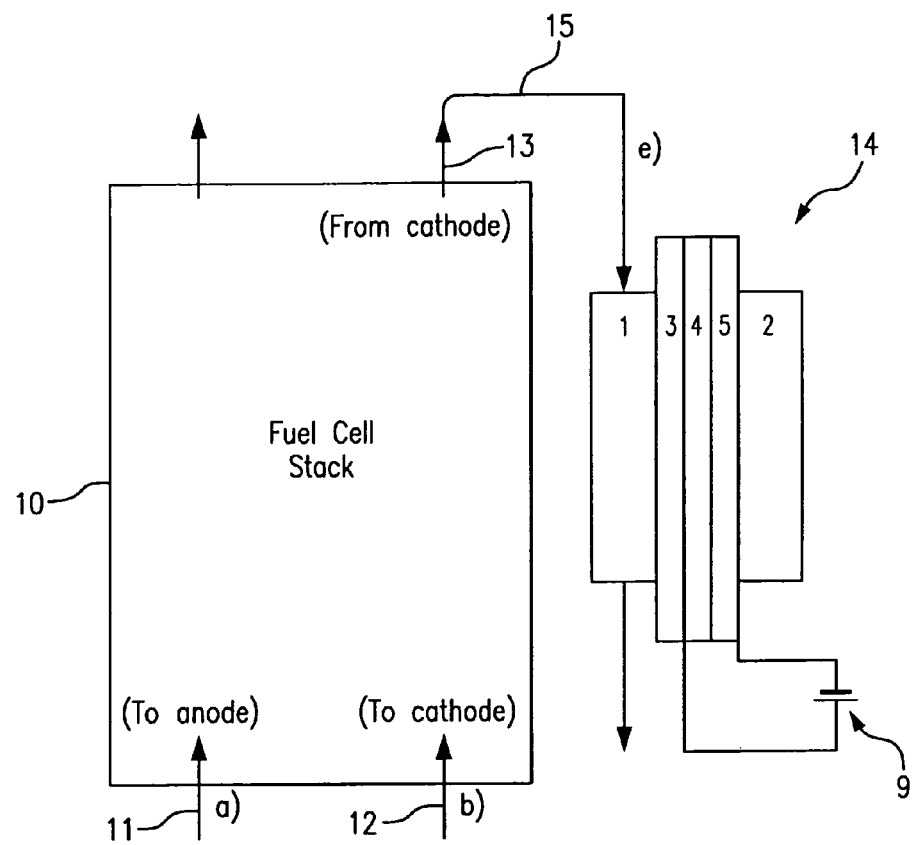
FIG. 6 is a block diagram of a fuel cell stack embodiment of the invention.

Test Setup:

The anode of a direct-methanol fuel cell stack 10 (see FIG. 6) was supplied with a methanol solution 11, and the cathode was supplied with air 12. The number of cells was 100, and the surface area of each cell was 300 cm². The total air flow was approximately 300 l/min. Using a measuring instrument, the methanol concentration in the exhaust gas was measured. In order to obtain a direct correlation between the methanol content in the exhaust gas and the voltage applied to the electrochemical cell under comparable experimental conditions, the experiment was started with a voltage V=1 Volt. The electrochemical cell 14 included three cells, which were identical to those in the fuel cell stack. The exhaust gas 13 from the stack 10 was conducted to the anode input 1 of the electrochemical cell 14 via a cathode collector conduit 15.

At a voltage of 1 V, the methanol content in the exhaust gas downstream of the electrochemical cell was 84 ppm. Increasing the cell voltage to 2 V produced a clear reduction to 73 ppm, and the further increase to 3 V produced a reduction to 50 ppm. The results of the experiment clearly document the operating principle of the design.

Figure 1:
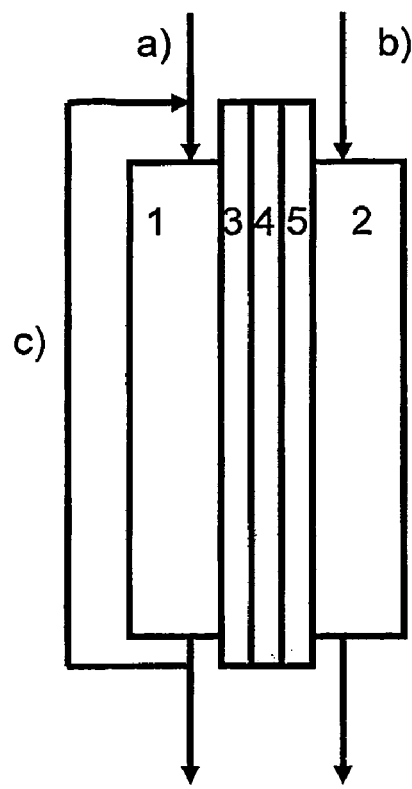
FIG. 1 is a schematic view of a fuel cell without further exhaust gas treatment.
Figure 2:
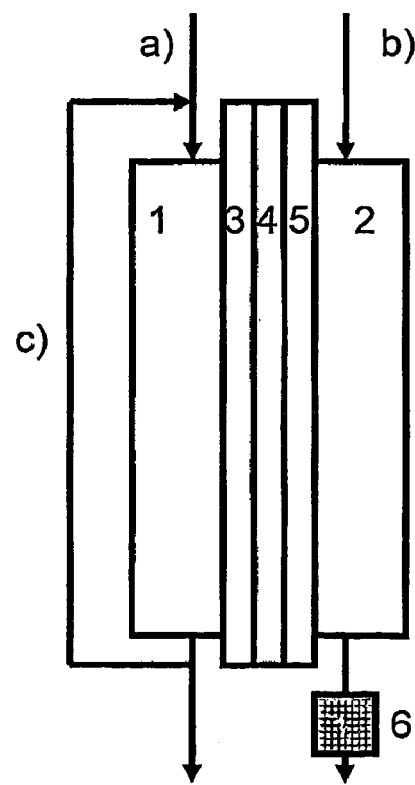
FIG. 2 is a schematic view wherein an exhaust gas catalyst is added to the exhaust gas flow.
Figure 3:
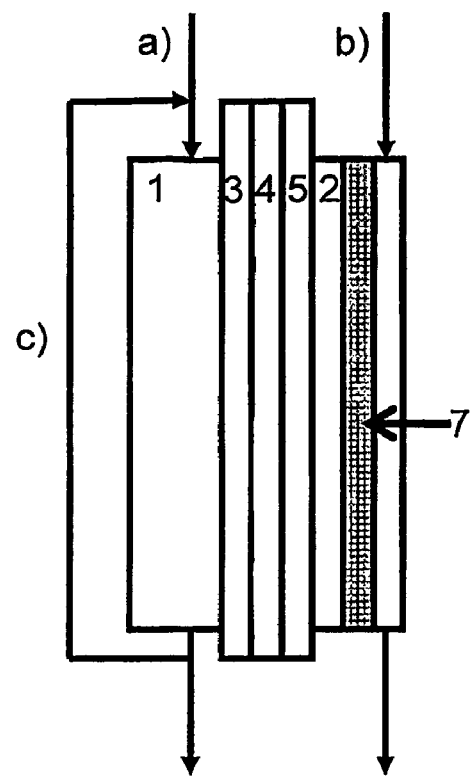
FIG. 3 is a schematic view showing a porous wall within the cathode region with the wall being coated with a catalyst.
Figure 4:
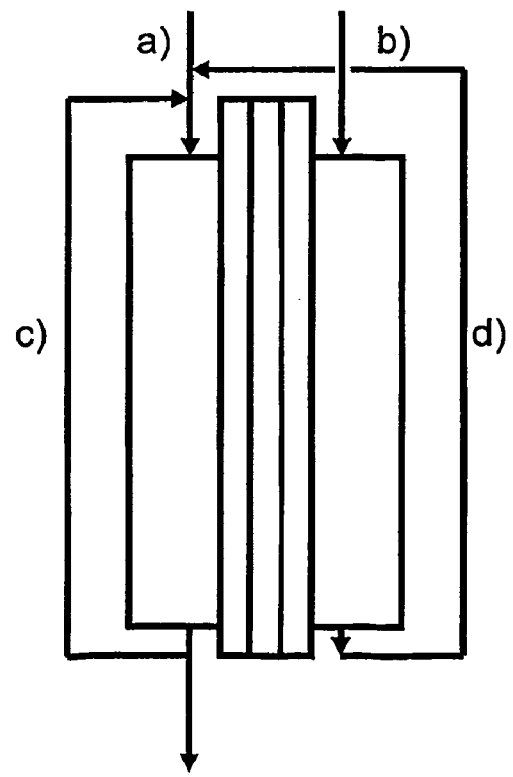
FIG. 4 is a schematic view wherein all of the cathode exhaust gas is supplied to the anode region.
Figure 5:
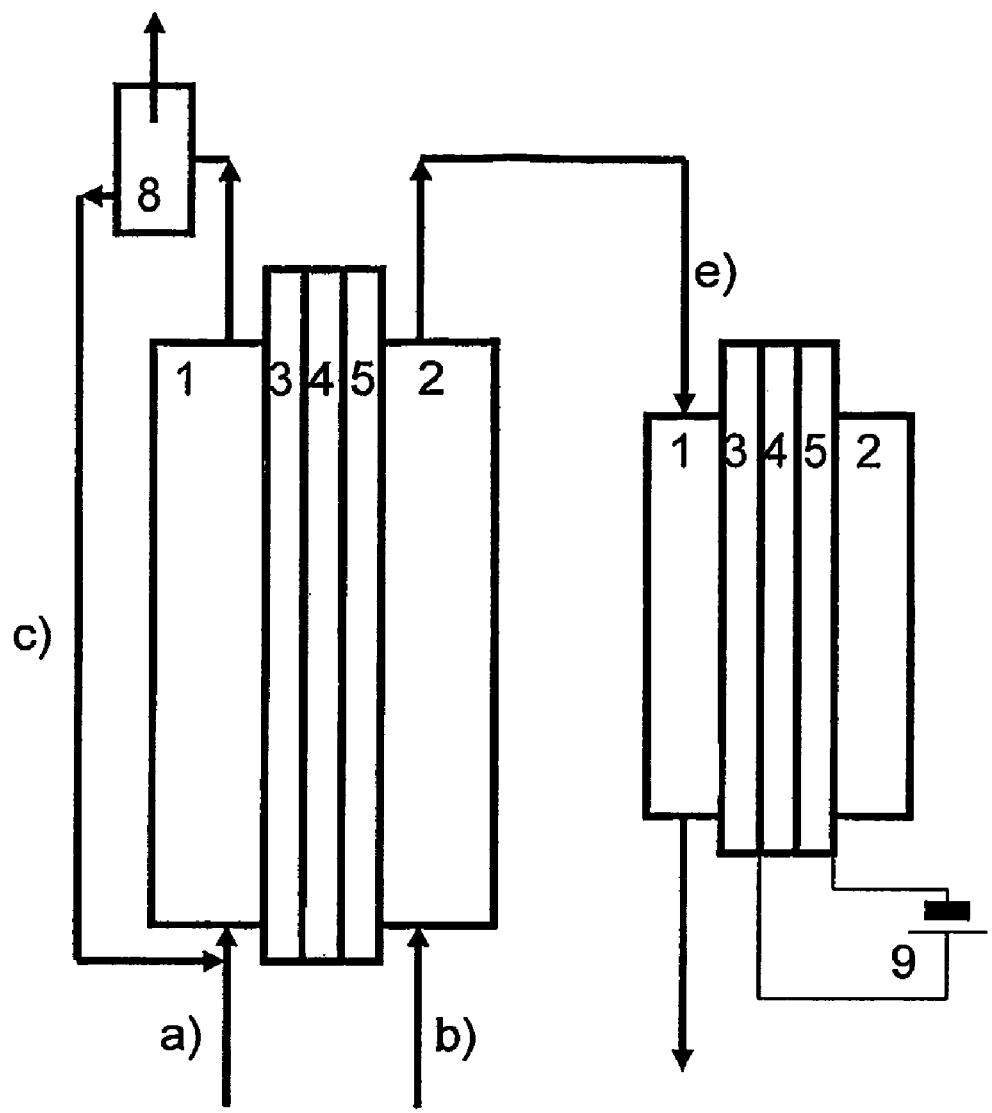
FIG. 5 is a schematic view of an embodiment of the invention wherein on the cathode exhaust gas side an additional electrochemical cell is disposed which is connected to an external voltage source.

FIGS. 1 to 4 show embodiments of a fuel cell, representative of a fuel cell stack according to the state of the art. In the figures, the following meanings apply:

1 anode region
2 cathode region
3 anode
4 electrolyte/membrane
5 cathode
6 exhaust gas catalyst
7 porous layer coated with catalyst
8 $CO_2$ separator
9 voltage source
a) fuel
b) oxidizing agent
c) recycling to the anode side
d) recycling of the oxidizing agent on the cathode side to an anode region
e) cathode exhaust gas for exhaust gas purification according to the invention FIG. 1 shows a schematic view of a fuel cell without further exhaust gas treatment. The fuel cell of FIG. 1 includes an anode region 1, a cathode region 2, an anode 3, an electrolyte/membrane 4, and a cathode 5. Also conduit a) is provided for fuel, conduit b) for an oxidizing agent and conduit c) for recycling to the anode side. In FIG. 2, a device 6 comprising an exhaust gas catalyst is added to the exhaust gas flow of the cathode. FIG. 3 discloses an embodiment having a porous wall 7 within the cathode region, the wall 7 being coated with a catalyst. FIG. 4 shows an alternative, according to which, all of the cathode exhaust gas is supplied by conduit d) to the anode region. FIG. 5 illustrates the invention. On the cathode exhaust gas side, an additional electrochemical cell is disposed downstream of the fuel cell, or the fuel cell stack, this cell being connected to an external voltage source 9. Cathode exhaust gas e), which comprises alcohol and/or CO is fed, as fuel, to the anode of this cell, and the undesirable by-products are advantageously electrochemically reacted. The oxidizing agent required for this process can be conducted to the cathode, for example, by simple diffusion of air through a porous wall or layer. FIG. 5 also shows a $CO_2$ separator 8.

The invention claimed is:

1. A fuel cell system, comprising at least one first fuel cell having an anode, a cathode, and an electrolyte disposed therebetween, conduits for supplying a fuel to the anode and an oxidizing agent to the cathode, an additional electrochemical cell disposed on an exhaust gas flow of the cathode of the first said fuel cell and is connected to an external voltage source, the cathode region of the first said fuel cell being connected to the anode region of the additional electrochemical cell.

2. The fuel cell system according to claim 1, comprising a fuel cell stack of direct-alcohol fuel cells, the additional electrochemical cell being disposed on the exhaust gas flow of the cathode collector conduit and serving to purify cathode exhaust from the fuel cell stack.

3. The fuel cell system according to claim 1, wherein a cathode of the additional electrochemical cell is separated from a surrounding area of the fuel cell system only by a porous layer.

4. A fuel cell system according to claim 1, wherein a direct-alcohol fuel cell is used as the additional fuel cell.

5. A fuel cell system according to claim 1, wherein a direct-alcohol fuel cell is used as the first and the additional fuel cells.

6. A method for operating a fuel cell system according to claim 1, wherein a voltage of between 0.5 and 5 V is applied between the anode and cathode of the additional electrochemical cell.

7. The method according to claim 6, wherein a voltage between 0.8 and 2 V is applied between the anode and cathode of the additional electrochemical cell.

8. A fuel cell system according to claim 1, having exhaust gas exiting from the cathode, and wherein purification of said exiting exhaust gas consists of being treated by the electrochemical cell.

9. A fuel cell system according to claim 2, having exhaust gas enter the first fuel cell stack cathode collector conduit, and wherein purification of said entering exhaust gas consists of being treated by the electrochemical cell.

10. A fuel cell system according to claim 1, wherein neither of said first fuel cell anode and cathode are connected to said external voltage source, nor to another external voltage source.

11. The method according to claim 6, wherein exhaust gas exits from the cathode region and enters the anode region of the additional electrochemical cell, wherein a voltage from the external voltage source is applied between an anode and a cathode of the additional electrochemical cell to purify the exiting exhaust gas.

12. A method for operating a fuel cell system according to claim 2, wherein exhaust gas enters the first fuel cell stack cathode collector conduit, flows into the anode region of the additional electrochemical cell, and is purified in response to a voltage from the external voltage source that is applied between an anode and a cathode of the additional electrochemical cell.

13. A fuel cell system that provides purification of cathode exhaust gas before the cathode exhaust gas is released as system exhaust, comprising:

at least one first fuel cell having an anode, a cathode, and an electrolyte disposed therebetween;
a conduit for supplying a fuel to the anode;
a conduit for supplying an oxidizing agent to the cathode;
a conduit for receiving cathode exhaust from the cathode;
an additional electrochemical cell having an anode region, cathode region, and a voltage source;
wherein the cathode exhaust receiving conduit is coupled to the additional electrochemical cell anode region so that the cathode exhaust gas flows into the anode region to undergo said purification and subsequent release as said system exhaust.

14. The fuel cell system of claim 13, wherein the additional electrochemical cell is of smaller size than the at least one first fuel cell.

15. The fuel cell system of claim 14, wherein neither of said first fuel cell anode and cathode are connected to said voltage source.

16. The fuel cell system of claim 14, wherein said at least one first fuel cell comprises a fuel cell stack having a plurality of first fuel cells, wherein said cathode exhaust receiving conduit is a collector conduit for cathodes of the fuel cell stack, and wherein said additional electrochemical cell serves the fuel cell stack to purify cathode exhaust gas of the fuel cell stack collected by the collector conduit and release the purified cathode exhaust gas as system exhaust.

17. A method for operating a fuel cell system according to claim 16, comprising:

collecting cathode exhaust gas from the fuel cell stack in the collector conduit;
receiving the collected cathode exhaust gas in the anode region of the additional electrochemical cell;
purifying the received cathode exhaust gas by chemical reaction in said anode region by applying a voltage between an anode and a cathode of the additional electrochemical cell; and
releasing said purified cathode exhaust gas as system exhaust; and
wherein purification of collected cathode exhaust gas consists of said purifying in said anode region of said additional electrochemical cell.

* * * * *